(12) United States Patent
Azadet

(10) Patent No.: US 7,548,599 B2
(45) Date of Patent: Jun. 16, 2009

(54) METHOD AND APPARATUS FOR REDUCING CROSS-TALK WITH REDUCED REDUNDANCIES

(75) Inventor: Kameran Azadet, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 1082 days.

(21) Appl. No.: 10/610,334

(22) Filed: Jun. 30, 2003

(65) Prior Publication Data

US 2004/0146002 A1   Jul. 29, 2004

Related U.S. Application Data

(60) Provisional application No. 60/443,260, filed on Jan. 28, 2003.

(51) Int. Cl.
   *H04B 1/10* (2006.01)
(52) U.S. Cl. .................. 375/350; 375/286; 379/406.01; 379/3; 370/201; 370/290
(58) Field of Classification Search ................. 375/350, 375/286, 290, 346; 370/201, 290, 286; 379/406.01, 379/406.08, 3
   See application file for complete search history.

(56) References Cited

U.S. PATENT DOCUMENTS

| | | | | |
|---|---|---|---|---|
| 4,268,727 A | * | 5/1981 | Agrawal et al. | 379/406.08 |
| 4,621,173 A | * | 11/1986 | Guidoux | 370/291 |
| 4,870,657 A | * | 9/1989 | Bergmans et al. | 375/233 |
| 5,181,198 A | | 1/1993 | Lechleider | 370/32.1 |
| 5,887,032 A | * | 3/1999 | Cioffi | 375/257 |
| 5,983,254 A | | 11/1999 | Azadet | 708/300 |
| 6,226,321 B1 | * | 5/2001 | Michels et al. | 375/227 |
| 6,421,377 B1 | * | 7/2002 | Langberg et al. | 375/222 |
| 6,463,041 B1 | | 10/2002 | Agazzi | 370/286 |
| 6,771,723 B1 | * | 8/2004 | Davis et al. | 375/350 |
| 6,934,387 B1 | * | 8/2005 | Kim | 379/406.08 |
| 6,975,677 B2 | * | 12/2005 | Matsumoto | 375/232 |
| 6,999,583 B2 | * | 2/2006 | Valenti et al. | 379/417 |
| 7,012,772 B1 | * | 3/2006 | Vis | 360/46 |

(Continued)

FOREIGN PATENT DOCUMENTS

EP   0 987 830 A1   3/2000

(Continued)

*Primary Examiner*—Jean B Corrielus
(74) *Attorney, Agent, or Firm*—Ryan, Mason & Lewis, LLP

(57) ABSTRACT

A method and apparatus are disclosed for reducing cross-talk in an unbalanced channel with a reduced number of redundancies. A cross-talk canceller is disclosed that uses a multi-dimensional finite impulse response (FIR) filter to process a received signal. Redundancies are reduced or even removed entirely by processing the signals received on each twisted pair in a vector form, using multi-dimensional finite impulse response filters. The signals received by a transceiver on each twisted pair are represented in a vector form so that the signals received on each twisted pair, and the cross-talk effect that each signal has on one another, can be performed collectively. A multi-dimensional cross-talk canceller processes a vector representation of the corresponding signals transmitted by the transceiver on each twisted pair. An adder sums the equalized vector representation of the signals received by the transceiver and the processed vector representation of the signals transmitted by the transceiver to generate an estimate of the received signal on each twisted pair.

15 Claims, 2 Drawing Sheets

U.S. PATENT DOCUMENTS

| | | | |
|---|---|---|---|
| 2001/0050987 A1* | 12/2001 | Yeap et al. | 379/399.01 |
| 2002/0037031 A1 | 3/2002 | Agazzi et al. | 375/220 |
| 2002/0150107 A1* | 10/2002 | Aronson et al. | 370/395.53 |
| 2003/0016770 A1 | 1/2003 | Trans et al. | 375/346 |
| 2003/0080890 A1* | 5/2003 | Hilton | 341/155 |
| 2003/0214903 A1* | 11/2003 | Lee | 370/201 |

FOREIGN PATENT DOCUMENTS

| | | |
|---|---|---|
| EP | 1 109 328 A1 | 6/2001 |
| EP | 1 443 676 A2 | 8/2004 |

\* cited by examiner

METHOD AND APPARATUS FOR REDUCING CROSS-TALK WITH REDUCED REDUNDANCIES

CROSS REFERENCE TO RELATED APPLICATIONS

This application claims the benefit of U.S. Provisional Application No. 60/443,260 filed Jan. 28, 2003; and is related to U.S. patent application Ser. No. 10/610,335, entitled, "Method and Apparatus for Reducing Noise In an Unbalanced Channel Using Common Mode Component," and U.S. patent application Ser. No. 10/610,336, entitled, "Multi-Dimensional Hybrid and Transpose Form Finite Impulse Response Filters," each incorporated by reference herein.

FIELD OF THE INVENTION

The present invention relates generally to cross-talk cancellation techniques, and more particularly, to methods and apparatus for reducing cross-talk on unbalanced channels with reduced redundancies.

BACKGROUND OF THE INVENTION

FIG. 1 illustrates a transceiver 100 that transmits and receives signals on a twisted pair (TP) 110. The transceiver 100 may be associated, for example, with a local area network (LAN) or a digital subscriber loop (xDSL). The main sources of crosstalk in such a transceiver 100 are usually near-end crosstalk (NEXT), echo crosstalk and far end crosstalk (FEXT). Each transceiver, such as the transceiver 100, transmits a first signal, $V_1$, and receives a different signal, $V_2$, on the same twisted pair 110. $V_1$ corresponds to the transmitted signal generated by the transceiver 100. $V_2$ corresponds to the received signal generated by a second transceiver 120. Since the transceiver 100 knows the transmitted signal, $V_1$, that it has generated, the transceiver 100 employs a "hybrid component" to subtract the transmitted signal, $V_1$, from the voltage ($V_1+V_2$) on the twisted pair (TP) 110, to obtain the voltage corresponding to the received signal $V_2$.

Near-end crosstalk results from transmitting and receiving different signals on different twisted pairs 110 and having a signal on one twisted pair interfering with the signal on another twisted pair. Echo crosstalk, on the other hand, is the result of crosstalk on the same twisted pair 110 and of discontinuous impedances along a given path, for example, at each connector. When the transceiver 100 transmits a signal, $V_1$, each impedance discontinuity along the path causes the transceiver 100 to receive a wave or echo back. Thus, a transceiver typically includes a near end cross-talk and echo canceller 200, discussed further below in conjunction with FIG. 2, to address the near end cross-talk and echo cross-talk and to improve the recovery of the transmitted signal.

Conventional cross-talk cancellers must consider the same signal on a given twisted pair multiple times in order to reduce the echo on the same twisted pair, as well as the near end cross-talk on each of the other twisted pairs. For example, in the case of four twisted pairs, there is a factor-of-four redundancy, since a given signal is used once for the echo cancellation on the same twisted pair and three additional times for the near end cross-talk on the other three twisted pair. Such redundancies unnecessarily consume circuit area and power. A need therefore exists for a cross-talk canceller that reduces the number of redundancies.

SUMMARY OF THE INVENTION

Generally, a method and apparatus are disclosed for reducing cross-talk in an unbalanced channel with a reduced number of redundancies. A cross-talk canceller is disclosed that uses a multi-dimensional finite impulse response (FIR) filter to process a received signal. While conventional cross-talk cancellers consider the same signal on a given twisted pair multiple times in order to reduce the echo on the same twisted pair, as well as the near end or far end cross-talk on each of the other twisted pairs, the present invention recognizes that the redundancies can be reduced or even removed entirely by processing the signals received on each twisted pair in a vector form. According to one aspect of the invention, multi-dimensional finite impulse response (FIR) filters are used to process the signals received on each twisted pair in a vector form. Thus, the signals received on each twisted pair, and the cross-talk effect that each signal has on one another, is performed collectively, rather than as a series of independent computations.

The signals received by a transceiver on each twisted pair are represented in a vector form so that the signals received on each twisted pair, and the cross-talk effect that each signal has on one another, can be performed collectively, in accordance with the present invention. The vector representation of the received signal is then equalized. A multi-dimensional cross-talk canceller processes a vector representation of the corresponding signals transmitted by the transceiver on each twisted pair. An adder sums the equalized vector representation of the signals received by the transceiver and the processed vector representation of the signals transmitted by the transceiver to generate an estimate of the received signal on each twisted pair. In this manner, the present invention reduces near-end crosstalk and echo on each twisted pair with a reduced or minimum number of redundancies by processing the signals received on each twisted pair in a vector form. The multi-dimensional finite impulse response filter may be embodied, for example, in direct, hybrid or transpose forms or another implementation of a finite impulse response filter.

A more complete understanding of the present invention, as well as further features and advantages of the present invention, will be obtained by reference to the following detailed description and drawings.

DETAILED DESCRIPTION

Figure 1:
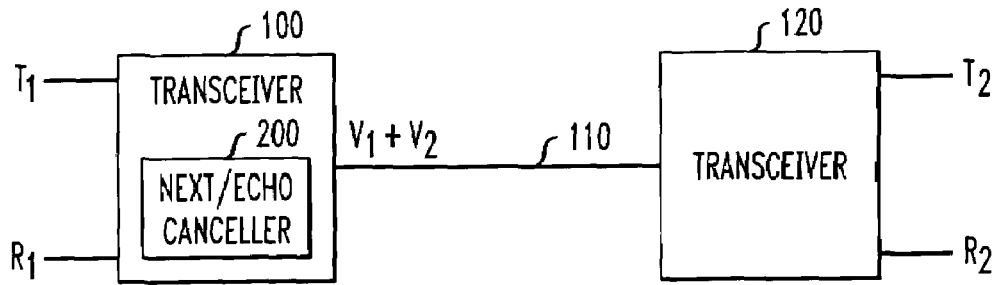
FIG. 1 illustrates a conventional transceiver that transmits and receives signals on the same twisted pair (TP)
Figure 2:
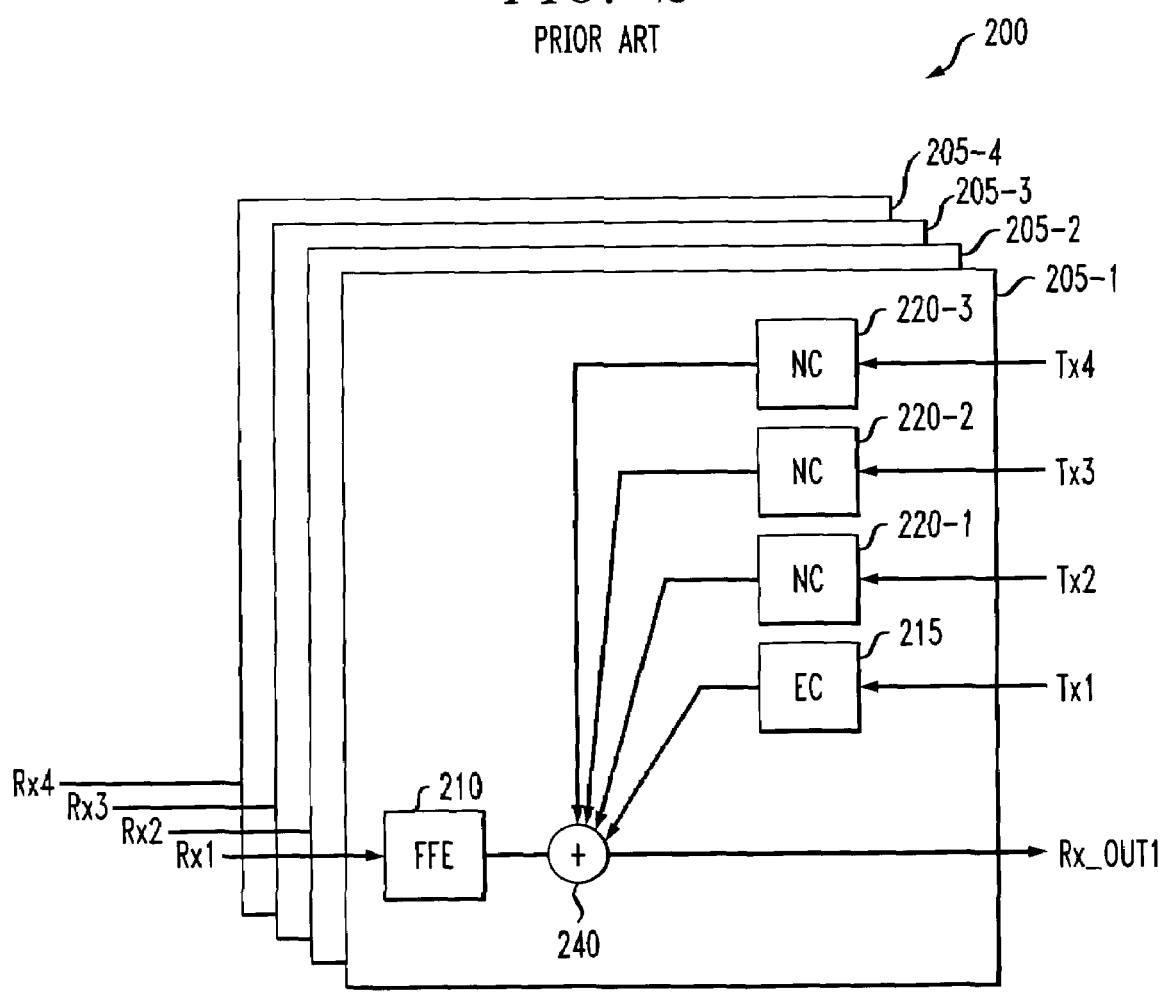
FIG. 2 illustrates a conventional near end cross-talk and echo canceller that may be employed in the transceivers of FIG. 1.

FIG. 2 illustrates a conventional near end cross-talk and echo canceller 200 that may be employed in the transceivers 100, 120 of FIG. 1. The exemplary near end cross-talk and echo canceller 200 processes four received differential signals, Rx1 through Rx4, each received on a unique twisted pair. As shown in FIG. 2, each of the four received differential signals, Rx1 through Rx4, are processed separately at stages 205-1 through 205-4, respectively. Each cross-talk and echo cancellation stage 205 equalizes the received signal using, for example, a feed forward equalizer 210, in a known manner.

In addition, each cross-talk and echo cancellation stage 205 includes an echo canceller 215 to address the echo crosstalk that is primarily the result of crosstalk on the same twisted pair, such as the twisted pair carrying the received signal Rx1 and the transmitted signal Tx1. As shown in FIG. 2, each cross-talk and echo cancellation stage 205 also includes near end cross-talk and echo cancellers 220-1 through 220-3 to address the near-end crosstalk that results from transmitting and receiving different signals on different twisted pairs and having a signal on one twisted pair interfering with the signal on another twisted pair. For example, near end cross-talk and echo canceller 220-1 addresses the cross-talk in the first received signal, Rx1, caused by the second transmitted signal, Tx2. Likewise, near end cross-talk and echo canceller 220-2 addresses the cross-talk in the first received signal, Rx1, caused by the third transmitted signal, Tx3. The outputs of the feed forward equalizer 210, echo canceller 215 and near end cross-talk and echo cancellers 220-1 through 220-3 are summed by an adder 240 to generate an estimate of the first received signal, Rx1 out.

As previously indicated, it has been found that conventional near end cross-talk and echo cancellers, such as the NEXT/echo canceller 200 shown in FIG. 2, must consider the same signal on a given twisted pair multiple times in order to reduce the echo on the same twisted pair, as well as the cross-talk on each of the other twisted pairs. For example, in the example of FIG. 2, the transmitted signal Tx1 is used by the echo canceller 215 on the cross-talk and echo cancellation stage 205-1 to remove echo from the received signal on the first twisted pair, and is also used by the near end cancellers 220 on the cross-talk and echo cancellation stage 205-2 through 205-4 for twisted pairs 2 through 4. Thus, in the present example, redundancies result from the same operation (e.g., a delay) being applied to the same input (e.g., Tx1) four times. The present invention recognizes that the redundancies can be reduced or even removed entirely by processing the signals received on each twisted pair in a vector form, where the vector includes an element corresponding to each twisted pair. Thus, the signals received on each twisted pair, and the cross-talk effect that each signal has on one another, is performed collectively, rather than as a series of independent computations.

Figure 3:
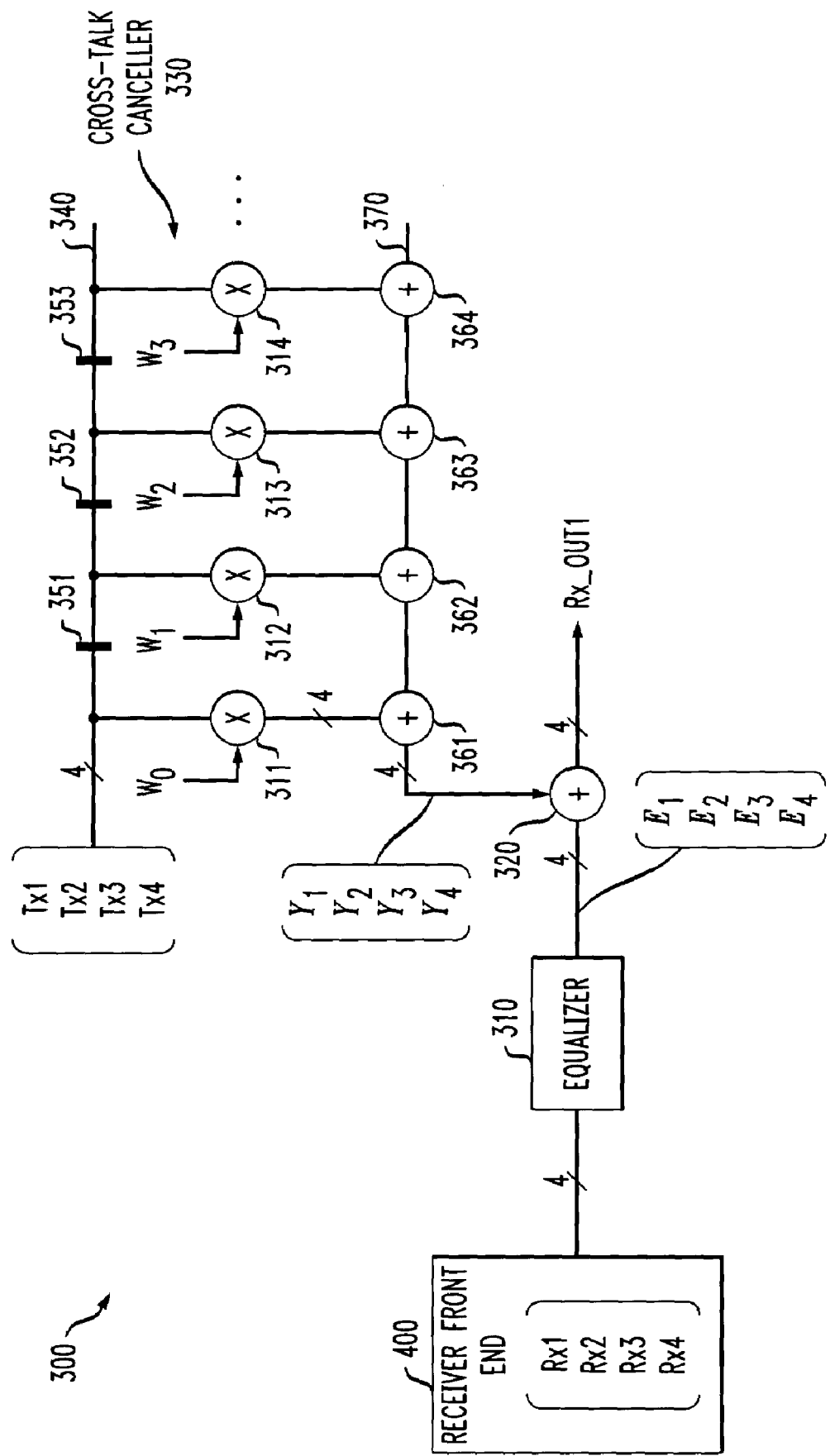
FIG. 3 illustrates a cross-talk canceller incorporating features of the present invention.

FIG. 3 illustrates a cross-talk and echo canceller 300 incorporating features of the present invention. Generally, as discussed further below, the present invention uses multi-dimensional finite impulse response (FIR) filters to process the signals received on each twisted pair in a vector form. In this manner, the signals received on each twisted pair, and the effect that each signal has on one another, is performed collectively, rather than as a series of independent computations. Each cross-talk and echo cancellation stage 205 for a given twisted pair may be embodied using a cross-talk and echo canceller 300.

The present invention recognizes that the received signal for each twisted pair can be expressed in a vector form, as shown in FIG. 3. The vector representation of the received signal includes, for example, four elements, Rx1, Rx2, Rx3 and Rx4, in the four twisted pair case. The cross-talk and echo canceller 300 thereafter equalizes the vector representation of the received signal using, for example, a feed forward equalizer 310, in a known manner. The feed forward equalizer 310 may be embodied, for example, as a multi-dimensional finite impulse response filter, in the same manner as the cross-talk canceller 330, discussed hereinafter.

As shown in FIG. 3, the cross-talk and echo canceller 300 includes a cross-talk canceller 330 that may be embodied, for example, as a direct form of a finite impulse response (FIR) filter (with delays in the input path) or another implementation of a finite impulse response filter. The multi-dimensional finite impulse response filters used herein have matrix coefficients. As shown in FIG. 3, the cross-talk canceller 330 comprises multipliers 311 through 314 having four taps with filter weights or tap coefficients, $W_0$ through $W_3$, respectively. These filter weights represent matrix multiplicands to be multiplied by input data traversing input path 340 In accordance with the known direct form, delay elements 351 through 353, which may be shift registers, are inserted on input path 340 and each disposed between two multipliers. In addition, adders 361 through 364 are disposed on output path 370 and each connected at the output of a multiplier. With such an arrangement, the z-transform of the transfer function of cross-talk canceller 330, H(z), is:

$$H(z) = W_0 + W_1 z^{-1} + W_2 z^{-2} + W_3 z^{-3} + \ldots \qquad \text{Eq. (1)}$$

For example, the first weight term, $W_0$, in the above equation corresponds to no delay and the second term, $W_1 z^{-1}$, corresponds to one stage of delay. It is noted that for a conventional implementation, the weights, $W_n$, applied to each filter tap are scalar values while the weights, $W_n$, applied to each filter tap in the present invention are matrix values (a 4 by 4 matrix in the present example). For a further discussion of suitable finite impulse response filters, see, for example, U.S. Pat. No. 5,983,254, incorporated by reference herein. Extending the finite impulse response filters described in U.S. Pat. No. 5,983,254 to the multi-dimensional case of the present invention is described in U.S. Pat. No. 7,263,541,entitled, "Multi-Dimensional Hybrid and Transpose Form Finite Impulse Response Filters."

The multipliers 311 through 314 each perform a matrix multiplication operation. For example, for four twisted pairs, each multiplication is a multiplication of a 4 by 4 matrix by a four component vector. As shown in FIG. 3, the output of the cross-talk canceller 330 can be expressed as:

$$Y(z) = H(z) Tx(z),$$

where H(z) is a matrix, defined above, and Tx(z) is the vector representation of the transmitted signal. In the time domain, the output, Yn, of the output of the cross-talk canceller 330 can be expressed as:

$$Y_n = W_0 Tx_n + W_1 Tx_{n-1} + W_2 Tx_{n-2} + \ldots$$

where n has a value between 1 and 4 in the present example.

In addition, the adders 361 through 364 each perform a vector addition of the four components. Thus, the output, Rx_out1, is a column matrix comprised of the four components (a component for each twisted pair). The output of the cross-talk canceller 330 is added to the output of the equalizer 310 by an adder 320, to generate an estimate of the first received signal, Rx1out (for the first twisted pair). Thus, the adder 320 adds the corresponding components of the equalized signal, En, and the cross-talk cancelled signal, Yn. The multi-dimensional implementation of equalizer 310 described herein provides the additional benefit of far end cross talk mitigation, since, in this configuration, the received signal on one twisted pair can be used to reduce FEXT on an adjacent pair in the same cable.

It is to be understood that the embodiments and variations shown and described herein are merely illustrative of the principles of this invention and that various modifications may be implemented by those skilled in the art without departing from the scope and spirit of the invention.

I claim:

1. A method for processing a received signal on each of a plurality of twisted pair, said method comprising the steps of:
   generating a vector representation of said received signal, wherein said vector representation includes a component for each of said twisted pair; and
   removing cross-talk from said received signal by applying said vector representation of said received signal to a multi-dimensional finite impulse response filter having matrix coefficients, wherein said removing step reduces redundant operations performed on said received signal relative to an implementation that employs a scalar representation of said received signal.

2. The method of claim 1, further comprising the step of equalizing said received signal.

3. The method of claim 1, wherein said removing step further comprises the step of removing near-end crosstalk that results from a signal on one twisted pair interfering with a signal on another twisted pair.

4. The method of claim 1, wherein said removing step further comprises the step of removing echo crosstalk that results from cross-talk on the same twisted pair.

5. The method of claim 1, wherein said removing step further comprises the step of removing far end crosstalk that results from two far end signals on adjacent twisted pair.

6. A receiver for processing a received signal on each of a plurality of twisted pair, comprising:
   a front end processor for generating a vector representation of said received signal, wherein said vector representation includes a component for each of said twisted pair; and
   a cross-talk canceller for removing cross-talk from said received signal by applying said vector representation of said received signal to a multi-dimensional finite impulse response filter having matrix coefficients, wherein said cross-talk canceller reduces redundant operations performed on said received signal relative to an implementation that employs a scalar representation of said received signal.

7. The receiver of claim 6, wherein said cross-talk canceller is further configured to remove near-end crosstalk that results from a signal on one twisted pair interfering with a signal on another twisted pair.

8. The receiver of claim 6, wherein said cross-talk canceller is further configured to remove echo crosstalk that results from cross-talk on the same twisted pair.

9. The receiver of claim 6, wherein said cross-talk canceller is further configured to remove far end crosstalk that results from two far end signals on adjacent twisted pair.

10. A method for processing a received signal on each of a plurality of twisted pair, said method comprising the steps of:
    generating a vector representation of said received signal, wherein said vector representation includes a component for each of said twisted pair; and
    applying said vector representation of said received signal to a multi-dimensional finite impulse response filter having matrix coefficients to process said received signal, wherein said applying step reduces redundant operations performed on said received signal relative to an implementation that employs a scalar representation of said received signal.

11. The method of claim 10, further comprising the step of equalizing said received signal.

12. The method of claim 10, wherein said applying step further comprises the step of removing near-end crosstalk that results from a signal on one twisted pair interfering with a signal on another twisted pair.

13. The method of claim 10, wherein said applying step further comprises the step of removing echo crosstalk that results from cross-talk on the same twisted pair.

14. The method of claim 10, wherein said applying step removes cross-talk from said received signal.

15. The method of claim 10, wherein said applying step equalizes said received signal.

* * * * *